Nov. 16, 1954  H. R. HADFIELD  2,694,372
AUTOMATIC MACHINE FOR MANUFACTURING TEXTILE GOODS
Filed July 6, 1951  7 Sheets-Sheet 1
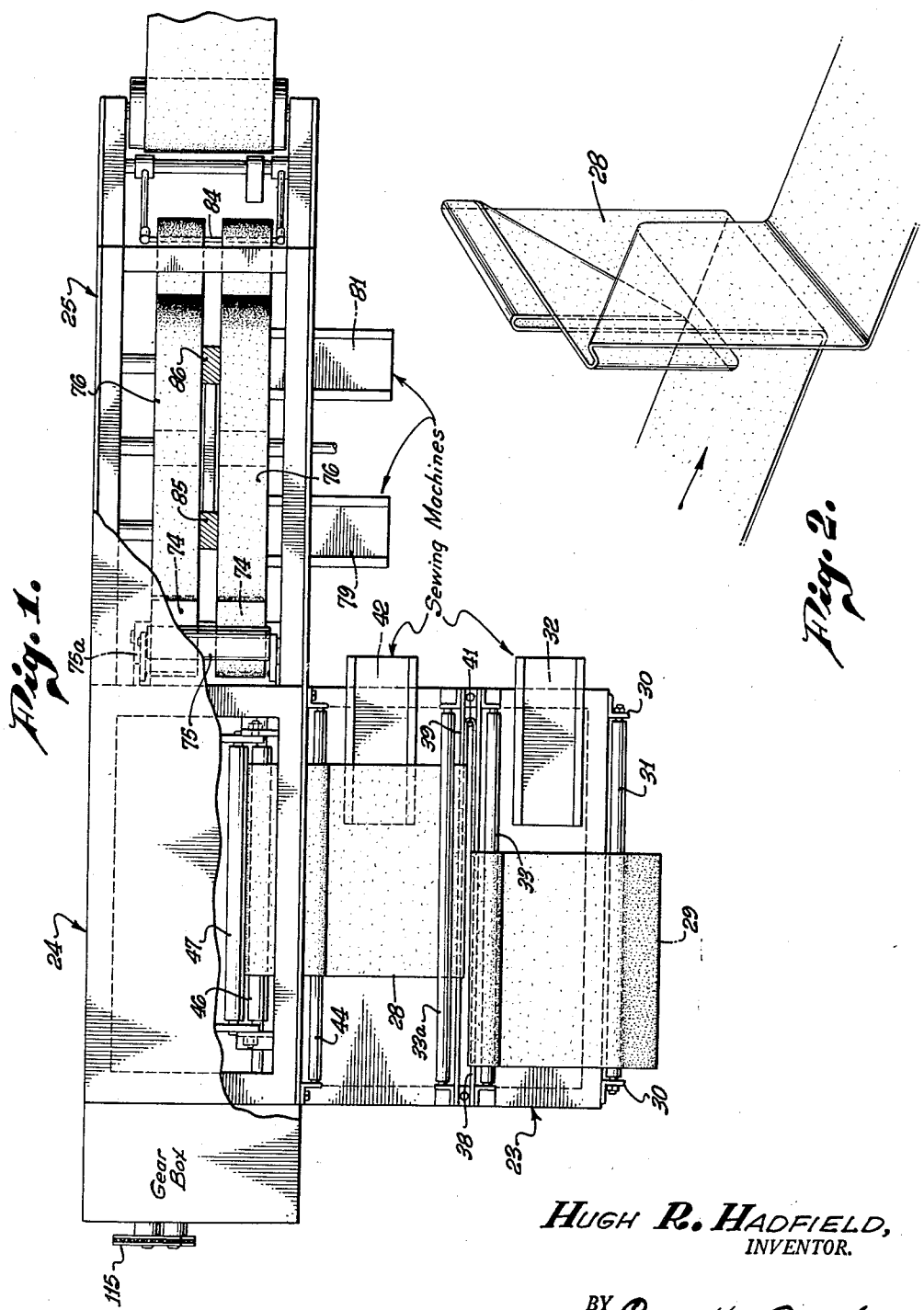
HUGH R. HADFIELD,
INVENTOR.
BY
ATTORNEY.

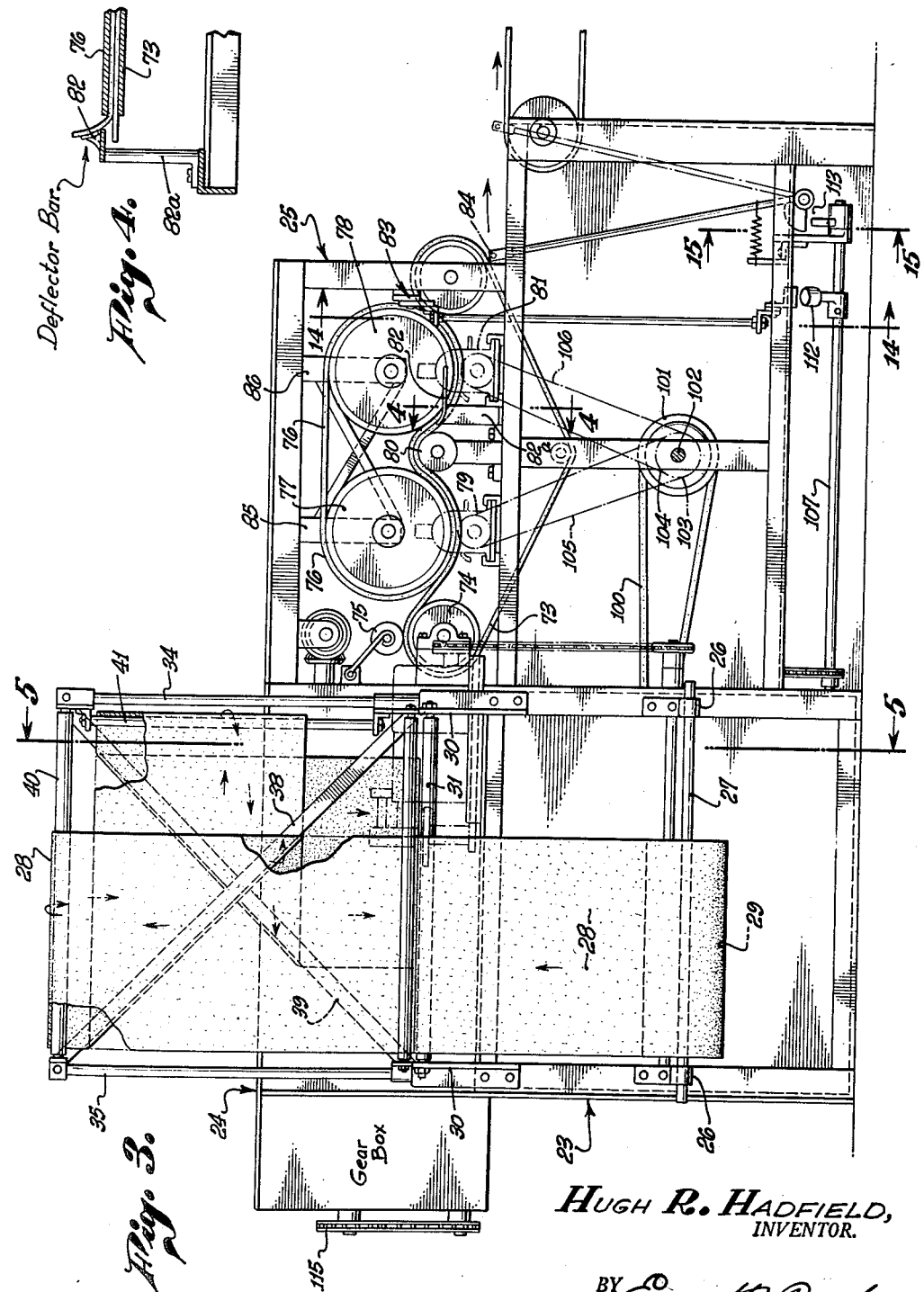

Nov. 16, 1954  H. R. HADFIELD  2,694,372
AUTOMATIC MACHINE FOR MANUFACTURING TEXTILE GOODS
Filed July 6, 1951  7 Sheets-Sheet 3
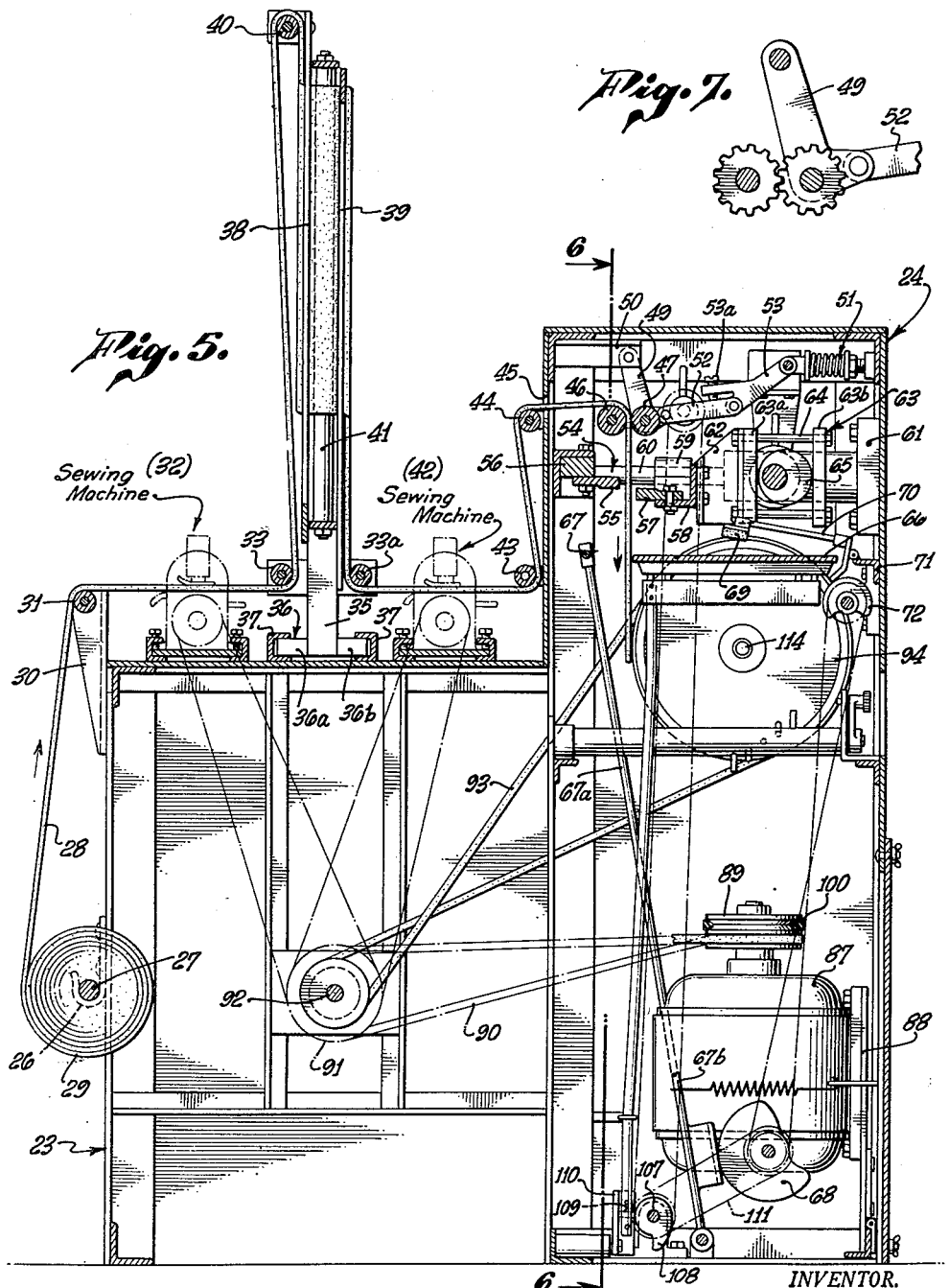
INVENTOR.
HUGH R. HADFIELD,
BY
ATTORNEY.

Nov. 16, 1954 H. R. HADFIELD 2,694,372
AUTOMATIC MACHINE FOR MANUFACTURING TEXTILE GOODS
Filed July 6, 1951 7 Sheets-Sheet 4

HUGH R. HADFIELD,
INVENTOR.

BY
ATTORNEY.

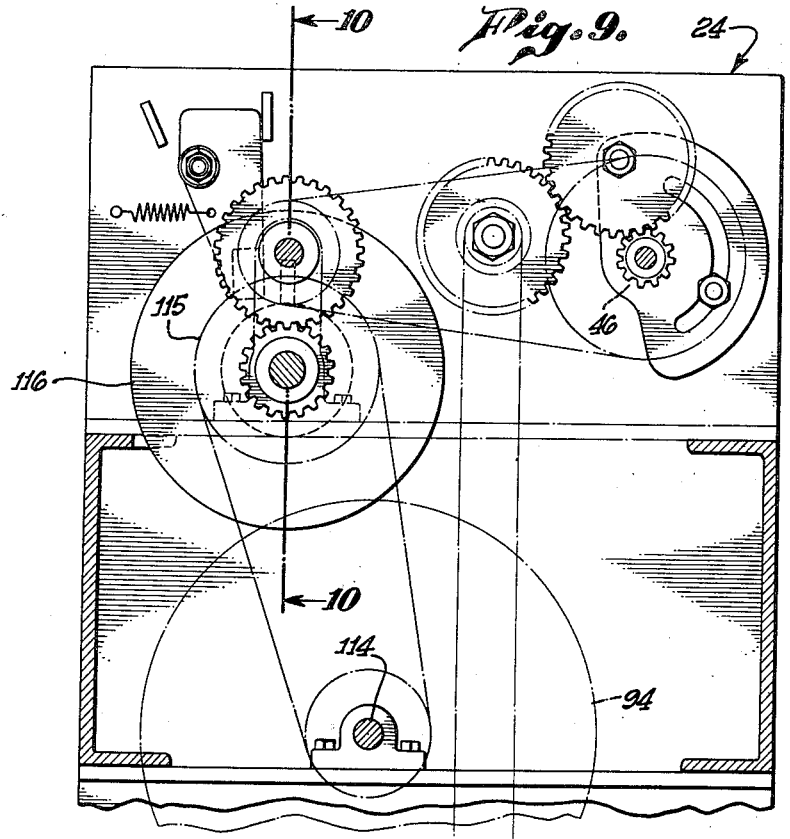
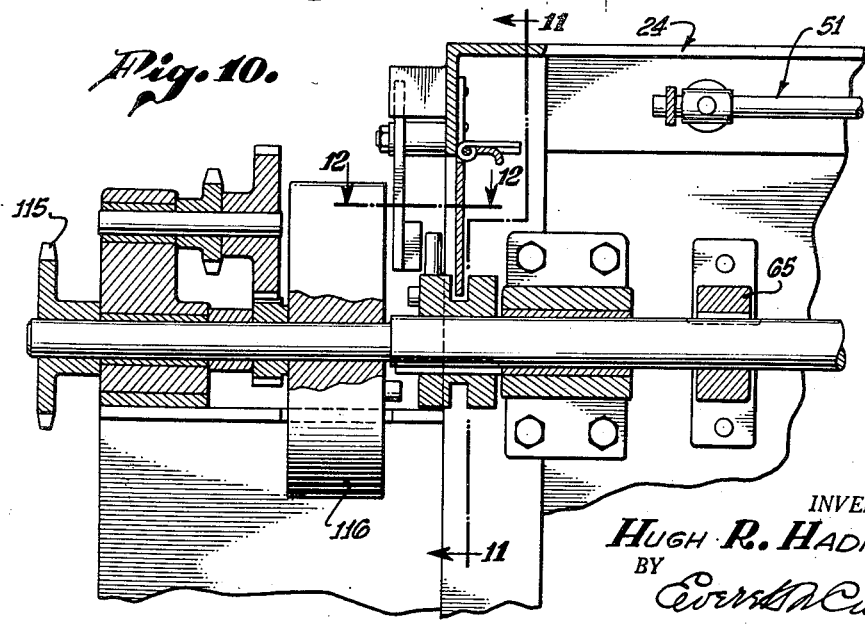

Nov. 16, 1954          H. R. HADFIELD          2,694,372
AUTOMATIC MACHINE FOR MANUFACTURING TEXTILE GOODS
Filed July 6, 1951          7 Sheets-Sheet 6
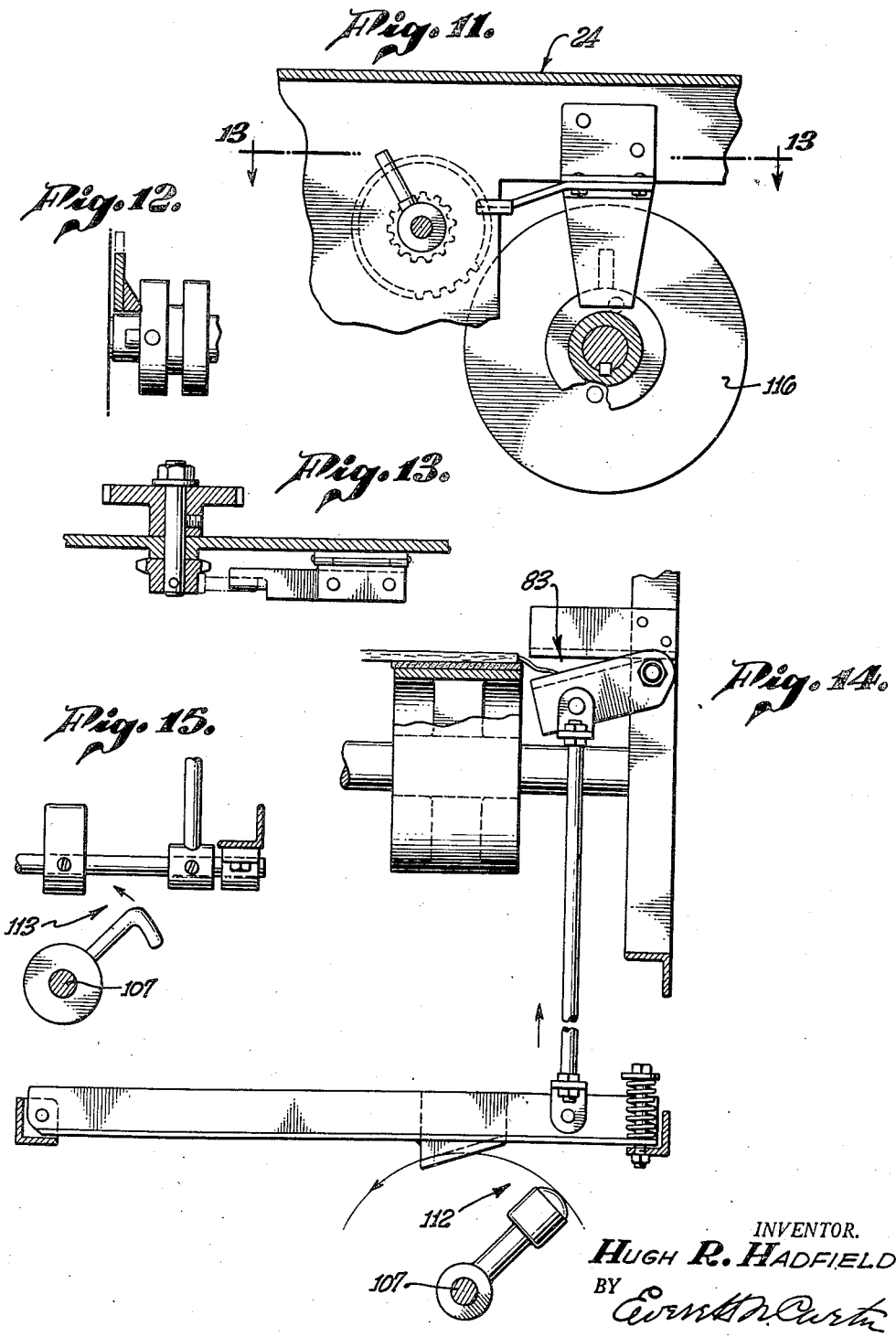
INVENTOR.
HUGH R. HADFIELD,
BY
ATTORNEY.

Nov. 16, 1954  H. R. HADFIELD  2,694,372
AUTOMATIC MACHINE FOR MANUFACTURING TEXTILE GOODS
Filed July 6, 1951  7 Sheets-Sheet 7
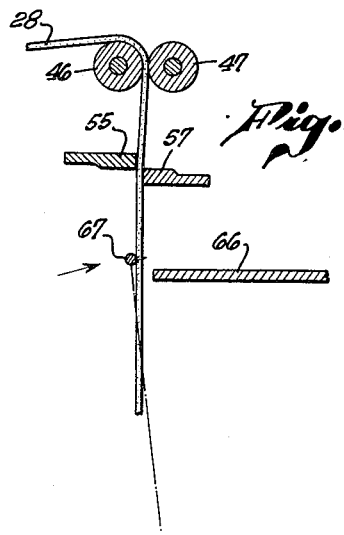
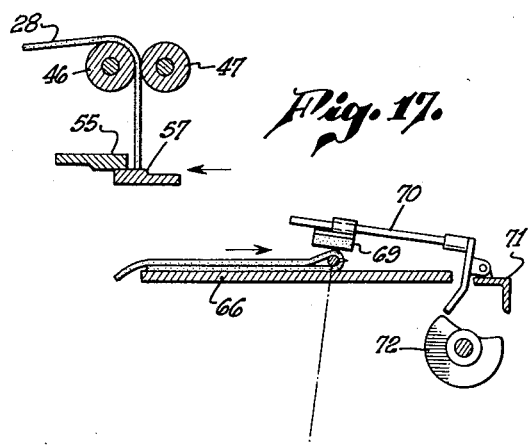
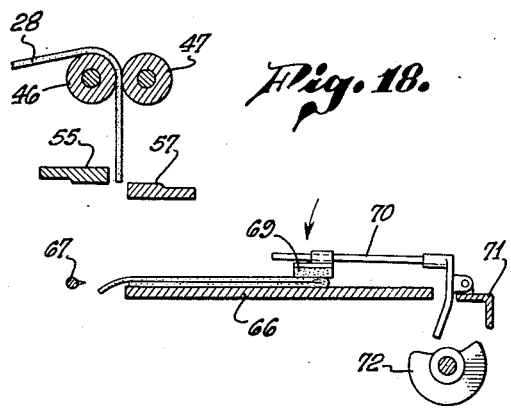
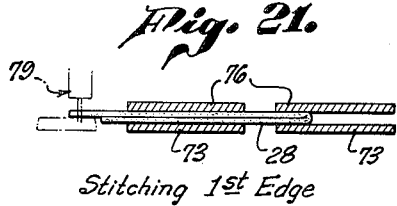
Stitching 1st Edge
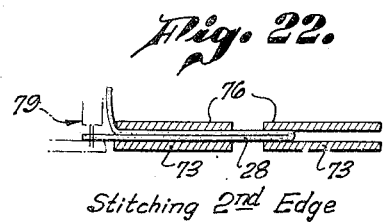
Stitching 2nd Edge
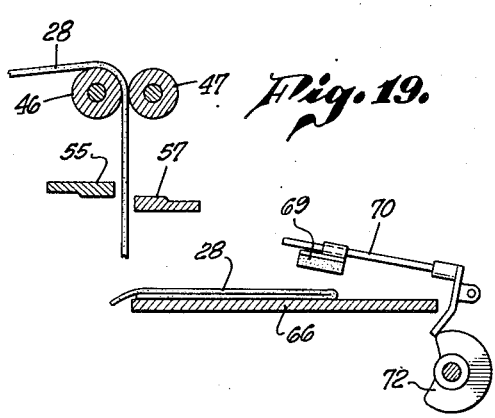
INVENTOR.
HUGH R. HADFIELD,
BY
ATTORNEY.

United States Patent Office

2,694,372
Patented Nov. 16, 1954

2,694,372

AUTOMATIC MACHINE FOR MANUFACTURING TEXTILE GOODS

Hugh R. Hadfield, La Jolla, Calif.

Application July 6, 1951, Serial No. 235,526

1 Claim. (Cl. 112—2)

My invention relates to automatic machines for the manufacture of textile goods, particularly as adapted for the cutting, edging, and folding of square or rectangular pieces of sheet material such as dish cloths, napkins, towels, wash cloths, pillow slips, pillow cases, bags, or textile articles of a similar character; and its objects are to combine in one individual machine, in automatic coordinated continuous sequential operations, a series of cooperative mechanical parts operable for the cutting edge and folding of the work piece; to dispense with the multiplicity of separate machines and cumbersome methods now employed for accomplishing this work; to allow all four edges of the work piece rapidly to be edged in the machine prior to removal therefrom; to cut from a roll of sheet material mounted upon the machine or placed conveniently adjacent thereto a plurality of uniform work pieces and thereafter to edge and fold the same without application of the human hand; to increase greatly and in a shorter time than heretofore the rate of production of the finished product; to render the parts more accessible for inspection, adjustment, removal, replacement, restoration or repair; and in general to provide a machine of this character which is simple and economical of construction, saving of labor, time and material, effective in action and of prolonged life and durability.

My invention further consists of other novel features of construction and combinations and arrangements of elements and parts illustrated in the drawing and as hereinafter more specifically pointed out and claimed.

In the manufacture of pieces of textile sheet material of the general character above described and as now commonly carried on in the art, various steps are employed requiring the manual attention of different individual workmen. The cloth to be used is first piled up in several thicknesses upon a table or bench by the workman and is then cut by him into uniform pieces or square or rectangular form through the use of an electric knife. These pieces are then taken in a pile to a stitching machine where a machine operator, taking successively from said pile each single piece, stitches against raveling such of the four edges thereof as are not already selvaged. Thereupon the pieces so stitched or selvaged are picked up by another workman or workmen, folded and assembled in units of a dozen, or whatever package the trade demands. This multiplication of operations each performed by an individual operator acting in line sequence with the others is cumbersome and costly in time, labor, and provision of machines, and is avoided through the use of my machine, which automatically cuts the cloth, stitches the edges of the separate piece, folds the same, and piles the finished pieces into groups ready for packaging and shipment. When, however, this work is performed by methods well known in the art, the edges are commonly stitched upon the stitching machine one at a time; the machine being stopped while the piece is turned by hand to present another edge to be stitched, all of which is time-consuming operation. On the other hand, in my machine all four edges are stitched automatically at the same time although not upon the same piece, and the machine is in rapid continuous operation. In my machine, a roll of a long strip of sheet textile material is mounted upon a shaft which is journalled in bearings located upon an extension of the front of the main frame, and from which the said material is unrolled over intermediate rollers and lead to a stitching machine upon said extension where one side edge of the strip is stitched. Upon the completion of such stitching, the strip is passed upwardly through a device secured to said extension and serving to turn the said strip edge for edge, and thereupon the said strip is led to another stitching machine also upon said extension where the other side edge of said strip is stitched. The said strip is then passed between rollers to the cutting mechanism mounted upon the frame, where the strip as it proceeds is cut into pieces of uniform length, which are successively placed upon a transfer table slidably or pivotally mounted upon said frame, and each piece folded back upon itself, with one end slightly overlapping the other end. From the said table, each piece is conducted successively over two moving belts to two additional stitching machines where the said ends are stitched. Thereafter, the threads connecting the goods so manufactured are severed, and the goods are discharged at the end of the machine.

Attention is hereby directed to the accompanying drawing, illustrating a preferred form of my invention, in which similar numerals of designation refer to similar parts throughout the several views, and in which, Figure 1 is a plan view of a machine embodying my invention, viewing from above the general assembly of parts;

Figure 2 is an isometric view of the strip of textile sheet material in the process of being turned side edge for side edge in the machine after one of the side edges has been stitched by the first stitching machine so as to bring the opposite edge in position for being stitched by the second stitching machine;

Figure 3 is a front elevation view of the machine shown in Figure 1;

Figure 4 is a section on line 4—4 of Figure 3, looking in the direction indicated by the arrows, and showing the diversion bar for permitting the stitching of the fourth edge of the work piece;

Figure 5 is a section on line 5—5 of Figures 3 and 6, looking in the direction of the arrows, and showing the turn-over device, the motor, cams, pulleys and belt connections, shears, feed rollers, and adjacent parts, and also the path of the strip;

Figure 7 is an end view of the feed rollers and operating gears, and parts of the pressure mechanism, as indicated by arrows 7—7 of Fig. 6;

Figure 9 is a section on line 9—9, of Figure 6, showing the change gears and pulley connections of the gear box;

Figure 10 is a section on line 10—10 of Figure 9, looking in the direction indicated by the arrows, and showing the shear shaft, and operative mechanism therefor;

Figure 11 is a section on line 11—11 of Figure 10, looking in the direction of the arrows, and showing a detail of said shear shaft operative mechanism;

Figure 12 is a detail view of the sliding sleeve employed for operating the shear; taken on line 12—12 of Fig. 10.

Figure 13 is a section on line 13—13 of Figure 11, looking downwardly in the direction of the arrows, and showing the tripping mechanism for controlling the shear;

Figure 14 is a detail view partly in section on line 14—14 of Figure 3, looking in the direction indicated by the arrows, and showing the thread shear and operating mechanism therefor;

Figure 15 is a view in detail of the actuating mechanism provided for operating the cam which moves the folding and unloading bar, looking in the direction of the arrows 15—15, of Fig. 3.

Figure 16 is a sectional view showing in detail the feed rollers shear blades, folding bar and transfer table at the beginning of the cut of the strip;

Figure 17 is a detail view partly in section of the transfer table and adjacent parts, showing the position of the feed rollers at the completion of the cut, the fold of the cut off piece of cloth about the folding bar held down upon the table by the resilient pad and the actuating cam and connecting mechanism;

Figure 18 is a view similar to Figure 17 showing the folding bar withdrawn, the resilient pad flattening out the fold, and the shear blade pushed apart;

Figure 19 is a view similar to Figure 18, showing the resilient pad in raised position through turning action of the cam;

Figure 20 is a cross section of the folding bar, showing one of the series of protruding spikes longitudinally embedded therein and positioned to engage with the overlap of the piece of cloth shown in Figure 18;

Figure 21 is a section of two pairs of belts carrying the said overlapping piece of cloth, showing the edge of the overlap about to be stitched by the third stitching machine, and Figure 22 is a view similar to that shown in Figure 21 but showing the overlapping stitched edge thrust upwardly to permit the opposite edge of the piece to be stitched by the fourth stitching machine.

Figure 6:
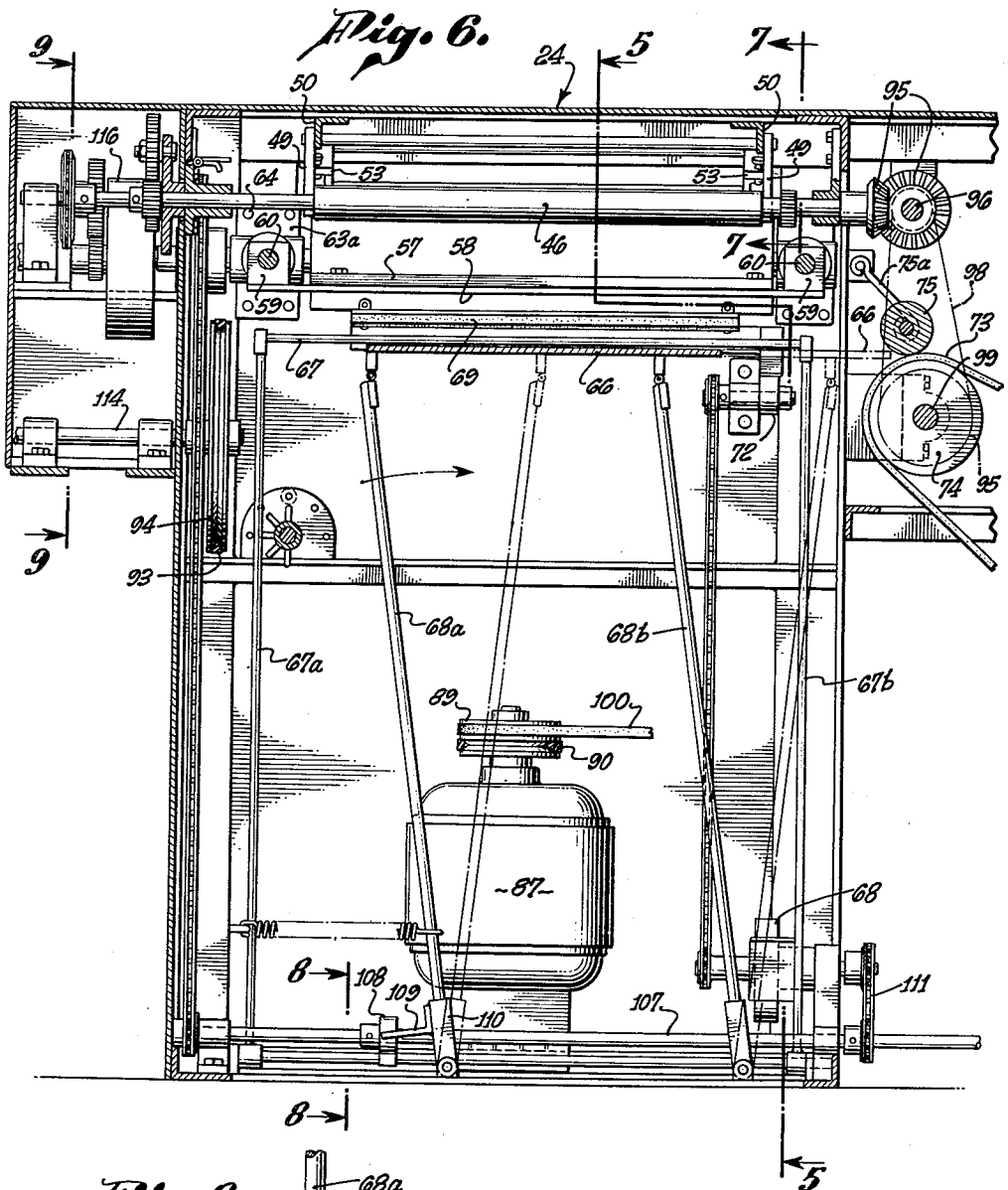
Figure 6 is a section on line 6—6 of Figure 5, looking in the direction indicated by the arrows, and showing the motor, belt connections, transfer table, folding bar, porcupine bar, feed rollers, change gears, and speed reducing mechanism.
Figure 8:
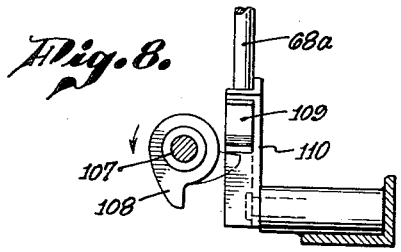
Figure 8 is a section on line 8—8 of Figure 6, looking in the direction indicated by the arrows, and showing the cam which serves to operate the transfer table by pushing up the clip, thereby causing the legs of said table to tip.

Referring to the drawing, the frame of the machine there shown comprises three rectangular component sections, 23, 24, and 25, which as a matter of constructive assembly may be made as a single indivisible unit, or be made separately and thereafter welded or bolted together to form a composite structure of associated parts. Preferably, each of the said component structural parts may be of cast iron, pressed steel, or other metal, but may be of any suitable material.

Firmly secured to the front of the component section 23, are the bearings 26, within which are journalled the ends of the shaft 27, having wound thereon the long continuous strip 28 of textile sheet material forming the roll 29, mounted upon said shaft and rotating therewith. Pivotally secured to the brackets 30 upon the front of said section 23, near the top edge thereof, and directly above said roll 29, is the roller 31, over which passes strip 28 at the beginning of its journey through the machine, aligned on its way to the first stitching machine 32, mounted upon the top of said frame section 23, where the right side of said strip is drawn across the sewing plate of this machine to be stitched or edged. Thereupon the said strip passes to rollers mounted upon a specially constructed turning device, where the strip is turned edge for edge. This device consists of two widely separated vertically disposed posts 34 and 35, mounted upon a base 36, formed of two steel bars 36a and 36b arranged in parallel relation and bolted to said posts. These bars slidably engaged with the channel irons 37 and 37, extending laterally across and securely attached to the top of the frame section 23, and forming a track or runway for the transverse movement of the base 36 supporting the said posts. Further connecting these posts and firmly secured thereto are the two obliquely positioned steel cross pieces 38 and 39 extending at a right angle to each other; one of said pieces being attached to the front of said posts and the other 39 to the rear thereof, with substantial clearance therebetween.

Pivotally mounted upon opposite sides of said posts, front and rear near the bottom thereof, are the rollers 33 and 33a; the roller 33 being contacted by the strip 28 after leaving the stitching machine 32. Thereafter the said strip, turning upwardly engages with the roller 40, pivotally mounted between and upon the upper ends of the posts 34 and 35, and turning over said roller travels downwardly and contacts and folds over the oblique cross piece 38, by which it is diverted to proceed horizontally to make contact with, and bend to pass over, the roller 41, vertically mounted upon the post 34; then passing to the left, the strip 28 contacts and bends to fold over the oblique cross piece 39. Thereupon the strip travels downwardly, and, passing under the roller 33a, travels horizontally to the second stitching machine 42, mounted upon the top of section 23, where the left side of the strip is drawn across the stitching plate of this machine 42, to be thereon stitched or edged. Now the strip 28 moves rearwardly to and under the roller 43 and thence to and over the roller 44, each of the said rollers being mounted upon the front of the section 24. From the roller 44, the strip passes through the aperture 45 to the feed rollers 46 and 47 located inside the frame section 24; the feed roller 46 being mounted in bearings affixed to the adjacent wall of said section, and the feed roller 47 being mounted in bearings affixed to the lower ends of the links 49 whose upper ends are pivotally attached to the brackets 50 bolted to the said wall. Also pivotally connecting the roller 47 to the pressure device 51 secured to the rear wall of frame section 24 are the links 52 and 53; the downward movement of the links 52 being limited by the stop 53a upon the link 53.

The strip 28 now proceeds to the shear 54, comprising the stationary shear blade 55 mounted upon the bracket 56 affixed to the wall of the front of section 24 and the traveling shear blade 57 mounted upon the movable carrier bar 58.

Upon each end of said carrier bar 58, is bolted one of the slide bearings 59, engaging with the slide shaft 60, the inner end of which is secured to the adjacent bracket 56, and the other end of which is seated in a socket provided therefor in the adjacent shear shaft bearing 61, firmly affixed to the rear wall of frame section 24. To the rear portion of the carrier bar 58, near the ends thereof are attached the two brackets 62, 62; and to each of said brackets is attached a steel frame 63, comprising bars 63a and 63b secured by the studs 64, 64 and preferably provided with thin facings of brass or other suitable bearing material adapted for contact with the cam 65. Upon rotation of the cam 65, the strip 28, passing between the cutting edges of the shear blades 55 and 57, has cut therefrom a work piece of predetermined length, which is deposited upon the transfer table 66, through the action of the folding bar 67, horizontally extending between the arms 67a and 67b; which arms are pivotally mounted upon the bottom of frame section 24, and actuated by the cam 68 in the manner hereinafter described. The table 66 is mounted upon the legs 68a and 68b, the lower ends of which are pivotally secured to bearings affixed to the bottom of section 24, and swing forward and back through the action of cams connected with mechanism provided therefor; the effect being, while holding the table substantially at a constant level, of causing the table to move sideways and to discharge the work piece therefrom in the direction of its travel through the machine. In order temporarily to secure from displacement the work piece upon the top of the table, I provide the pad 69 applied to the free end of the arm 70, which is pivotally mounted on the bracket 71, affixed to the rear wall of section 24, and actuated by the cam 72 operatively connected with mechanism provided therefor.

When the transfer table 66 has reached the limit of its sideways movement, it comes temporarily to a stop upon contacting a pair of transmission belts 73, 73 running over pulley 74 mounted upon frame section 25, and the end of the transfer table nudges the small roller 75 mounted upon the swinging bracket 75a pivotally secured to the front wall of section 25; the arrangement being such that the roller 75 upon the progression of the work piece will slightly rise, and by reason of gravity fall back upon the top of the work piece, thereby bringing about and insuring its proper contact and carriage upon the belts 73, 73. Superimposed upon the pair of belts 73, 73, is another pair of belts 76, 76, which are arranged to run over pulleys 77 and 78, mounted upon hangers 85, 86, depending from and secured to the top of the frame section 25, and which are located to depress the belts 73, 73, and thus tightly to grip the work pieces thereby sandwiched between these pairs of belts and traveling therewith. Located between and above the bottoms of the pulleys 77 and 78, is the roller 80 mounted to rotate upon standards affixed to frame members forming part of the section 25 and serving to push upwardly the said belts and sandwiched work pieces therebetween in their travel thereover and to cause them to pursue an undulatory path through two depressions formed thereby immediately beneath these pulleys. Also mounted upon the said frame members and at the bottom of the said depressions are the third and fourth stitching machines 79 and 81; the third stitching machine 79 being located adjacent to the first depression and adapted for stitching the upper and protruding end of the work piece, and the fourth stitching machine 81 being adapted for stitching the other end of the work piece. To effect this result after the said upper end of the said work piece has been stitched by the third machine, I provide the deflection bar 82 mounted upon a standard 82a affixed to said frame members and adapted to divert upwardly the said upper end of the work piece so stitched, so as to protrude the other end thereof and to allow the fourth stitching machine 81 to stitch the same; both of these stitching operations being performed with great speed while the work piece is on its way rapidly moving pairs of belts 73, 73 and 76, 76. After the edges and ends of the work piece have thus been stitched, it rises still sandwiched between said belts out of the second depression formed by pulleys 77, and passes between the blades of a small open side shear 83 adjacent thereto and mounted upon the rear of the frame 25, where the machine threads continuing to attach said work piece to the preceding work piece are severed, and, through the action of the bar 84 of similar construction to the folding bar 67 and similarly mounted and actuated upon arms pivotally secured to the bottom of frame 25, the severed work piece upon the opening of the belts as shown in Figure 3, is removed from its sandwiched position therebetween and is swept downward to be discharged upon a moving belt or other convenient depository.

The power of my machine is created and distributed as follows:

In the lower right hand corner of Figure 5 I show an electric motor 87, attached vertically to a hinged bracket 88 affixed to the outer wall of section 24, which allows the motor partly to be withdrawn from the machine structure for inspection or other service. This motor is equipped with a double groove V-belt pulley 89, from which all power used by the machine is taken. A quarter twist belt 90 runs in one groove of pulley 89 to a pulley 91 on shaft 92 journalled in bearings mounted on section 23 as shown in Figure 5, from which shaft belts are taken to the first stitching machine 32 and the second stitching machine 42. Also from this shaft 92 is taken a cross belt 93, to pulley 94, mounted on the framework of section 24 which pulley by a short shaft delivers power by chain drive and gearing to the shear, and through shaft connections with feed roller 46 power is delivered to a pair of bevel gears 95 as shown in Figure 6. The gears 95 mounted upon the said framework and connected with shaft 96 deliver power by chain and sprocket 98 to the shaft 99 which is journalled in bearings of brackets affixed to the frame 24, and which drives the belts 73 and 76.

Figure 6 shows in part a second belt 100, and Figure 3 shows connection of belt 100 to a pulley 101 on shaft 102, which shaft also carries on its outer end two pulleys 103 and 104 from which belts 105 and 106 drive stitching machines 79 and 81. Along the bottom of Figure 6 is shown a shaft 107 which is journalled in bearings on the bottom of frame 24 and which extends the full length of the machine and actuates the cam 108, serving to operate the transfer table 66, by contacting the bracket 109, attached to leg 110. By chain drive 111 the shaft 107 drives the cam 68 for operating folding bar leg 67. Figure 3 shows the extension of this shaft 107 carrying the cam 112, which operates the open throat shear 83 carrying the cam 113, which operates the unloading bar or ultimate folding bar 84.

Figure 6 shows the method of power distribution from the cross belt 93 to the shaft 114 and by chain to sprocket 115 and thence to fixed feed roller 46 and on to mechanism heretofore described. Adjacent to sprocket 115 is shown fly wheel 116 and the several gears and pinions required for speed reduction and control of the mechanism which perform the tasks assigned them and herein described.

The gears required for changing from one size to another of the goods to be manufactured are numerous and used only one at a time. The arrangement for driving and changing such change gears are not claimed as new, being similar to the gear-changing equipment used on such tool machines as lathes for many years. The lowest speed likely to be required would be for shaft 107 at ten revolutions per minute, and the highest speed likely to be required would be for stitching machines at 4,000 revolutions per minute. The power and speed for all of these requirements are provided in the mechanism described.

By the word "edging," as used in the claim, I desire to be understood as meaning, to those skilled in the art, an overedging of a single thickness of material.

My invention may be embodied in other specific forms without departing from the spirit or essential characteristics thereof. The present embodiments, as above set forth, are therefore to be considered in all respects as illustrative and not restrictive, the scope of my invention being indicated by the appended claim rather than by the foregoing description, and all changes which may come within the meaning and range of equivalency of the claim are therefore intended to be embraced therein.

What I claim and desire to secure by Letters Patent is:

In an automatic machine for cutting and edging uniform work pieces from a strip of textile material in coordinated, continuous and sequential circumferential edging operations, the combination of a frame, means for mounting upon and permitting to be unrolled thereon a strip of sheet textile material, stitching means secured to said frame and adapted to stitch one side edge of said strip as it is being unrolled; means including spaced cross pieces obliquely mounted on said frame and adapted to turn said strip side edge for side edge after one edge is so stitched; stitching means affixed to said frame for thereafter stitching the other side edge of said strip; cutting means secured to said frame for cutting said strip so edged into work pieces of uniform length, together with means for guiding said strip to said cutting means; and means connected with said frame for folding the said work pieces and separately and sequentially stitching and edging the cut ends thereof; and means for detaching and discharging said work pieces from the machine.

References Cited in the file of this patent

UNITED STATES PATENTS

| Number | Name | Date |
|---|---|---|
| 489,590 | Marble et al. | Jan. 10, 1893 |
| 1,187,057 | Foster | June 13, 1916 |
| 1,688,268 | Dalton | Oct. 16, 1928 |
| 2,053,257 | Anderson | Sept. 8, 1936 |
| 2,313,433 | Golden | Mar. 9, 1943 |
| 2,546,831 | Newell | Mar. 27, 1951 |